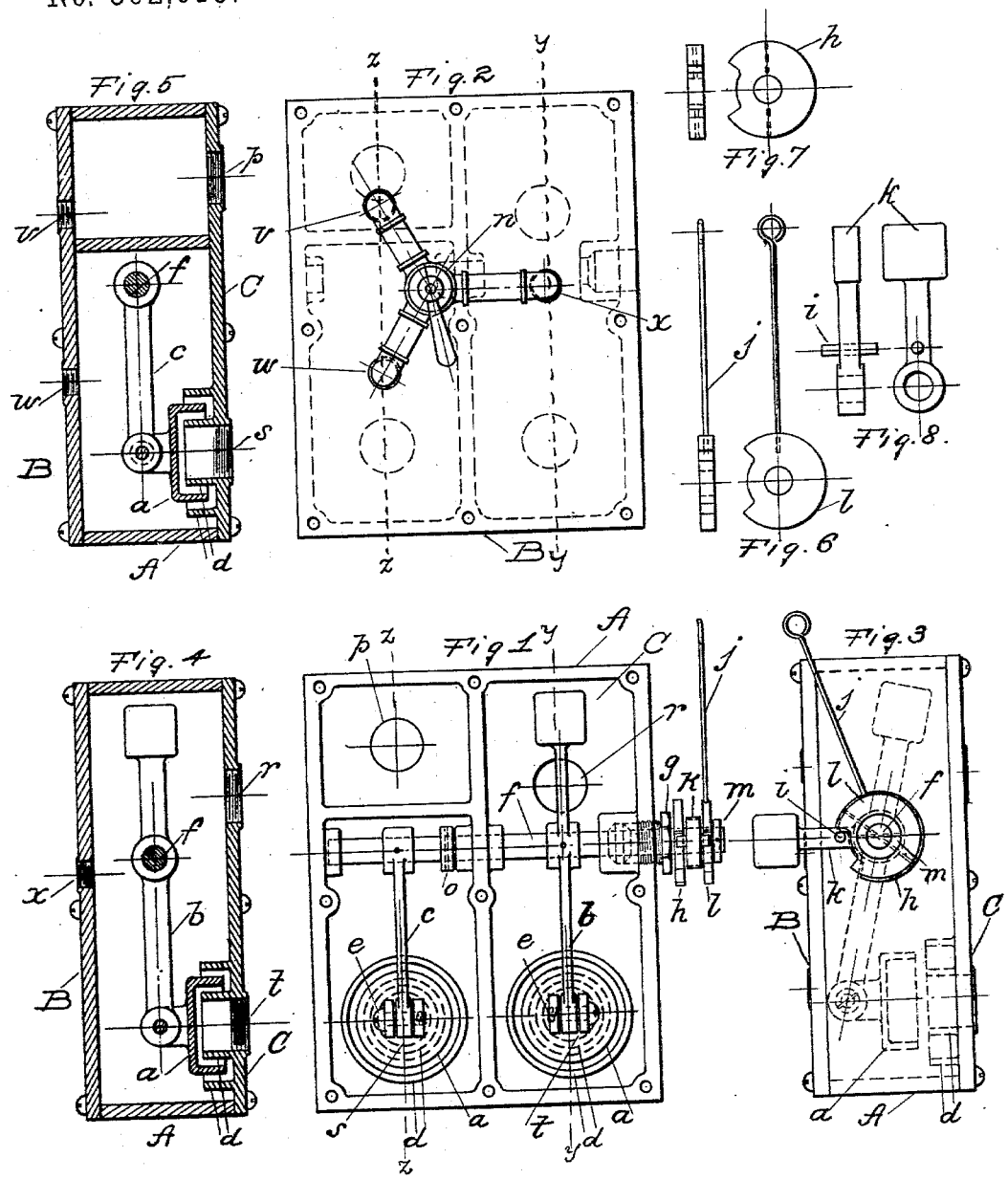
(No Model.) 2 Sheets—Sheet 1.
W. D. KENNEDY.
MIXER FOR GAS AND AIR.
No. 562,619. Patented June 23, 1896.
Witnesses
Jules Bauduc Jr
C. M. Peychaud.
Inventor
W. D. Kennedy

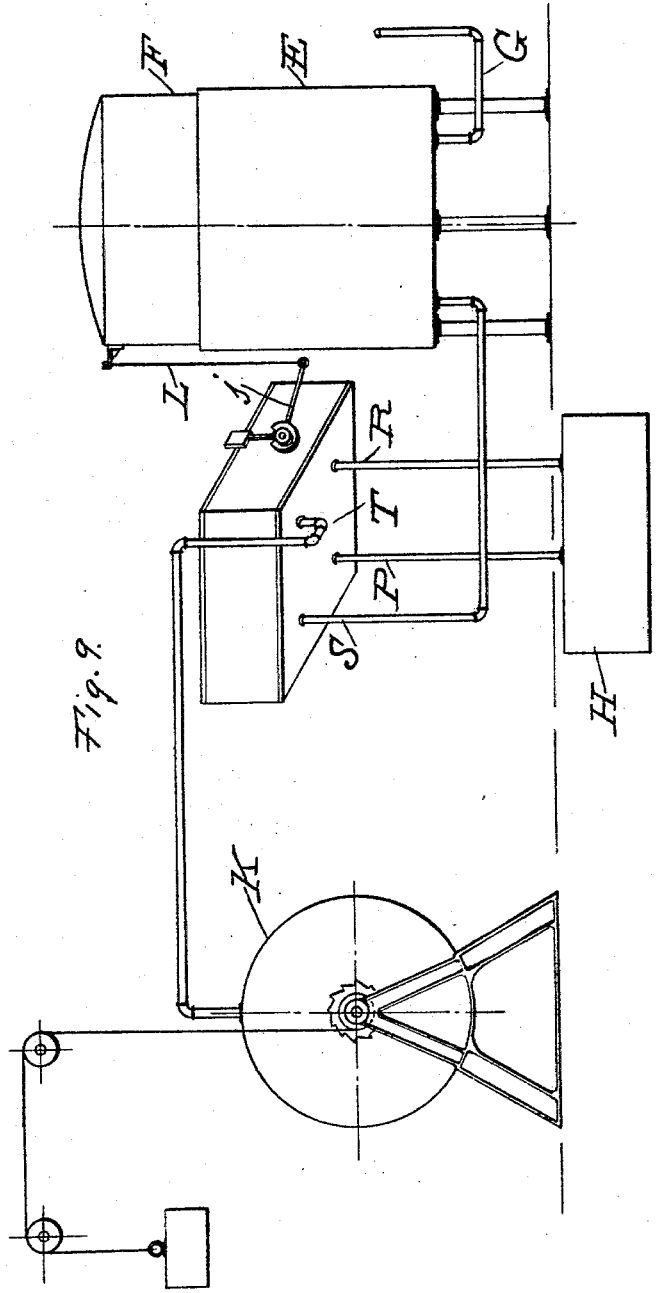

UNITED STATES PATENT OFFICE.

WILLIAM DENIS KENNEDY, OF GRETNA, LOUISIANA.

MIXER FOR GAS AND AIR.

SPECIFICATION forming part of Letters Patent No. 562,619, dated June 23, 1896.

Application filed April 8, 1895. Serial No. 544,981. (No model.)

*To all whom it may concern:*

Be it known that I, WILLIAM DENIS KENNEDY, a citizen of the United States, residing at Gretna, in the parish of Jefferson and State of Louisiana, have invented a new and useful Mixer for Illuminating-Gas Machines, of which the following is a specification.

My invention relates to improvements in mixers for illuminating-gas machines, such as generate gas from gasolene-oil; and it consists universally of an air-pump, a carbureter or generator, a mixer, and a gas-holder.

The objects of my improvements are, first, to provide absolutely tight valves in a mixer; and, second, to control the mixture of air from the pump and gas from the carbureter in proportion, so as to produce a serviceable mixture for illuminating purposes with greater facility than has been done heretofore. I attain these objects by the mechanism shown in the accompanying drawings and following description.

Figure 1 is a plan of the three-chambered box A with cover B removed, showing the interior construction. Fig. 2 is a plan of cover B with three-way cock and connections attached. Fig. 3 is a side view of box, showing shifting mechanism. Fig. 4 is a vertical section through box on line $y\,y$. Fig. 5 is a vertical section on line $z\,z$. Fig. 6 shows disk $l$ with lever $j$ attached. Fig. 7 shows disk $h$. Fig. 8 shows weighted lever $k$ with pin $i$ attached. Fig. 9 shows the pipe connections of my mixer with the air-pump K K, the carbureter H, and the gas-holder E F, the whole forming a complete installation.

The box is made of suitable metal, consisting of the body A, Fig. 1, a top cover-plate B, Figs. 2, 3, 4, and 5, a bottom cover-plate C, Figs. 1, 3, 4, and 5, the whole forming an absolutely gas and air tight box partitioned into three separate and distinct chambers. In the body A is placed the spindle $f$, Figs. 1, 3, 4, and 5, and being fitted into the bearings so as to turn easily without allowing gas to leak through. On side of box is provided stuffing-box into which is screwed the gland $g$, Fig. 1, stuffing-box being filled with suitable packing, the whole forming an absolutely tight bearing. Upon the spindle $f$ are fixed two levers $b$ and $c$, Figs. 1, 4, and 5, being held in position by pins. The lever $b$ is provided with a weight at one end and a boss at the other end. The lever $c$ is provided with a boss at its end. The two metal cups $a\,a$, Figs. 1, 4, and 5, swing from the ends of levers $b$ and $c$, being attached thereto by screws $e\,e$, Fig. 1. Upon the end of spindle $f$ is placed the clutch for lifting or dropping the cups $a\,a$ into the mercury-cups in C, hereinafter mentioned. This clutch consists of the disk $h$, Figs. 3 and 7, pinned to spindle and notched, as shown, the disk $l$, Figs. 3 and 6, working freely on spindle $f$ and provided with a lever $j$, the end of which being formed into an eye, as shown. Between the disks $h$ and $l$ is placed lever $k$, provided with pin $i$, Figs. 3 and 8, sufficiently long to fit into the notches in disks $h$ and $l$. Outside of disk $l$ and at end of spindle is placed collar $m$, pinned to spindle. The collar $o$ is pinned to spindle inside box to keep it from working out.

The bottom cover C is secured to body A to make a perfectly gas-tight joint by means of screws, and is provided with four tapped openings $p\,r\,s\,t$, Figs. 1, 4, and 5. Around openings $s$ and $t$ are provided concentric annular rings $d\,d$, the space between them to be filled with mercury, and to be of sufficient height to keep the mercury from running over the sides.

The top cover B, Figs. 1, 2, 4, and 5, is secured to body A by means of screws, so as to be perfectly gas-tight, and is provided with three tapped openings located so that only one hole comes over each compartment formed by the partitions in A.

Fitted to cover B is the three-way cock $n$, Fig. 2, each of its openings being connected to one of the openings in cover B. The three-way cock $n$ is so constructed that all three openings may be open at once, and that one opening only may be partly or wholly closed.

The operation of the mixer is as follows: Atmospheric air is supplied from the air-pump K, Fig. 9, through the pipe T and entering mixer at opening $t$, Fig. 1. The cups $a\,a$ being raised to the position shown by $a$, Fig. 3, air passes on to opening $r$, Fig. 1, and through pipe R, Fig. 9, to carbureter H, which being partly filled with gasolene-oil, said gasolene-oil evaporating easily, the air passing through carbureter is charged with this vapor, the mixture formed being an inflammable gas suitable for illuminating purposes. This gas then passes through pipe P to opening p, Fig. 1. The three-way cock n, Fig. 2, then allows the passage of air from opening x and inflammable gas from opening v in such proportions as to make a perfectly serviceable mixture for illuminating purposes, which then passes through opening w, and from there passes through opening s, and by way of pipe S, Fig. 9, to the gas-holder E F. The three-way cock n, Fig. 2, may also be set so as to shut off opening x in part or altogether, in case it is not desirable to dilute the gas from v with air. The gas-holder E F, Fig. 9, consists of an upright tank E, containing water, and an inverted tank F, balanced in the water contained in tank E. The serviceable mixture, as it is supplied through pipe S, fills the tank F and causes it to rise and to lift lever j, Figs. 1, 3, and 9, by means of rod L, Fig 9. The notched disk l, Figs. 1 and 3, engages pin i, which throws the lever k, bringing its weight to bear against the notched disk h by means of pin i, and in this manner causes spindle f to rotate so as to dip cups a a into the mercury in the basin on cover C, thus shutting off the gas to E F and air from K, Fig. 9. The gas leaving gas-holder through pipe G in time causes tank F to fall, which reverses the clutch and again opens the mercury-valves in the same manner as it closed them.

I am aware that other gas-mixers have been constructed prior to my invention, but none containing any of the distinctive features or general arrangement of mine.

What I do claim as my invention, and desire to secure by Letters Patent, is as follows:

1. The combination in a gas-mixer of a closed box, divided by suitable partitions into three compartments, one of the compartments having an inlet for supplying air thereto, one of the compartments having an inlet for supplying gas thereto; both having outlets for communication with the third chamber; said third chamber having an inlet for mixed gas and air, said inlet being connected by pipes with the outlets of the gas and air compartments, the three pipes being connected at their junction by a three-way cock controlling the passage of gas and air respectively, from the first two chambers to the third chamber; the third chamber also having an outlet for the mixed gas and air substantially as set forth.

2. The combination in a gas-mixer of a closed box, divided by suitable partitions into three compartments, one of the compartments having an inlet for supplying air thereto; one of the compartments having an inlet for supplying gas thereto; both having outlets for communication with the third chamber; said third chamber having an inlet for mixed gas and air, said inlet being connected by pipes with the outlets of the gas and air compartments, the three pipes being connected at their junction by a three-way cock controlling the passage of gas and air respectively, from the first two chambers to the third chamber; the third chamber also having an outlet for the mixed gas and air; with the shifting mechanism consisting of the fixed disk h, the loose disk l, and the weighted lever k loose on spindle, said shifting mechanism serving to operate the controlling-valves, a a, substantially as set forth.

WILLIAM DENIS KENNEDY.

Witnesses:
F. J. TILLOTSON,
JNO. B. LYMAN.